US009956894B2

(12) United States Patent
Jang et al.

(10) Patent No.: US 9,956,894 B2
(45) Date of Patent: May 1, 2018

(54) APPARATUS FOR OPENING AND CLOSING SLIDING ARMREST CONSOLE

(71) Applicants: Hyundai Motor Company, Seoul (KR); Kia Motors Corporation, Seoul (KR); NIFCO KOREA Inc., Asan, Chungcheongnam-do (KR)

(72) Inventors: Jung Yoon Jang, Incheon (KR); Jae Hyun An, Seoul (KR); Kwan Bo Lee, Gyeonggi-do (KR); Chang Hoon Yang, Gyeonggi-do (KR); Ik Jin Jung, Gyeonggi-do (KR); Geun Hueng Kim, Chungcheongnam-do (KR); Byoung Jun Cho, Gyeonggi-do (KR)

(73) Assignees: Hyundai Motor Company, Seoul (KR); Kia Motors Corporation, Seoul (KR); NIFCO KOREA Inc., Asan, Chungcheongnam-do (KR)

( * ) Notice: Subject to any disclaimer, the term of this patent is extended or adjusted under 35 U.S.C. 154(b) by 8 days.

(21) Appl. No.: 15/174,697

(22) Filed: Jun. 6, 2016

(65) Prior Publication Data
US 2017/0057387 A1 Mar. 2, 2017

(30) Foreign Application Priority Data
Aug. 31, 2015 (KR) .......................... 10-2015-0122537

(51) Int. Cl.
*B60N 2/46* (2006.01)

(52) U.S. Cl.
CPC ........... *B60N 2/4686* (2013.01); *B60N 2/466* (2013.01); *B60N 2/4646* (2013.01)

(58) Field of Classification Search
CPC ..... B60N 2/4646; B60N 2/466; B60N 2/4686
See application file for complete search history.

(56) References Cited

U.S. PATENT DOCUMENTS

2011/0227359 A1    9/2011  Fesenmyer

FOREIGN PATENT DOCUMENTS

| JP | H08-113086 A | 5/1996 |
| KR | 20050058574 A | 6/2005 |
| KR | 20050120112 A | 12/2005 |
| KR | 10-1500271 B1 | 3/2015 |

*Primary Examiner* — D Glenn Dayoan
*Assistant Examiner* — Melissa A Black
(74) *Attorney, Agent, or Firm* — Mintz Levin Cohn Ferris Glovsky and Popeo, P.C.; Peter F. Corless

(57) ABSTRACT

An apparatus for opening and closing an armrest is provided. After an armrest is slid to a position, the position of the armrest is selectively locked or unlocked using an armrest locking unit to thus prevent the weight of the armrest or vibrations of a vehicle from accidentally changing the position of the armrest against the intention of the user. The operation of unlocking the opening/closing plate from the console body and the operation of unlocking the sliding cover from the opening/closing plate are performed simultaneously with a single unlocking manipulation to allow a user to rapidly and conveniently perform the operations of opening/closing and sliding the armrest.

9 Claims, 7 Drawing Sheets

APPARATUS FOR OPENING AND CLOSING SLIDING ARMREST CONSOLE

CROSS REFERENCE TO RELATED APPLICATION(S)

The present application claims priority to Korean Patent Application No. 10-2015-0122537, filed Aug. 31, 2015, the entire contents of which is incorporated herein for all purposes by this reference.

BACKGROUND

Field of the Invention

The present invention generally relates to an apparatus for opening and closing a sliding armrest console and, more particularly, to an apparatus for opening and closing a sliding armrest console and preventing the sliding and open position of an armrest from being accidentally changed due to vibration while a vehicle is being driven.

Description of the Related Art

A console box having an armrest structure is disposed within a vehicle between the driver's seat and the front seat next to the driver's seat (e.g., front passenger's seat). The console box provides support to a driver's arm or a front passenger's arm placed thereon and is used as a storage compartment. When a driver or a front passenger is sitting on the seat in the front of the vehicle, it is known that an arm is in a comfortable position when the lower portion thereof is lightly supported with the shoulder being relaxed.

Thus, when the driver or the front passenger places an arm on the armrest, it is possible to reduce fatigue caused by long-time driving, thereby preventing an accident that would otherwise occur unexpectedly. In addition, a hinge unit including several elements, such as a hinge and a pivot shaft, is attached to the armrest. With this configuration, the upper part (i.e. the cover) of the armrest may be pivoted, and thus, articles may be contained within the console box. In addition, provided is a locking unit that prevents the console box from being opened when the console box is not used, and thus, the console box functions as the armrest.

Recently, the armrest is configured with the capability of sliding forwards and backwards based on the body conditions of a person sitting on a seat. In other words, the armrest is adjustable and capable of being slid in the forward and backward direction based on the body shape of the person on the seat, and thus, the arm may be supported by the armrest. In particular, the armrest is set to the body conditions of the person on the seat. When the user intends to open the console box in the position in which the armrest is slid forwards, the adjusted position of the armrest causes difficulty in manipulating the locking unit. Thus, after the armrest is required to be slid backwards to thus manipulate the locking unit and access the console box.

However, when the user attempts to use the console box by manipulating the locking unit without completely sliding the armrest backwards, the armrest is erected in the opened position. Then, the armrest may fall downwards due to the weight thereof or due to vibrations of the vehicle, thereby causing noise or injuring the user.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus for opening and closing a sliding armrest console enabling a person seating on one of the front seats to open a console box by manipulating a lever after the armrest is slid forwards.

According to one aspect of the present invention, an apparatus for opening and closing a sliding armrest console may include: a console body; an opening/closing plate pivotably disposed on the console body; and a sliding cover configured to slide on the opening/closing plate. The opening/closing plate may include a locking lever that enables the opening/closing plate to be locked to and unlocked from the console body and a plurality of locking recesses configured to restrain the sliding of the sliding cover, the locking recesses being spaced apart predetermined distances from each other. The apparatus may further include an unlocking unit disposed on the sliding cover, wherein the unlocking unit works in conjunction with the locking lever to unlock the opening/closing plate in response to a pivoting manipulation, and based on positions of the sliding cover, may be released from one of the plurality of locking recesses into which the unlocking unit has been fitted, thereby allowing the sliding cover to slide.

The unlocking unit may include: a manipulation lever pivotably disposed on a front end of the sliding cover, wherein the manipulation lever allows the locking lever to be unlocked by the pivoting manipulation at an initial position of the sliding cover; a hook lever pivotably disposed at a rear of the manipulation lever to work in conjunction with the manipulation lever, wherein the hook lever may be fitted into a locking recess among the plurality of locking recesses formed in the opening/closing plate to restrain the sliding of the sliding cover, and may be removed from the locking recess among the plurality of locking recesses when the manipulation lever is manipulated to pivot; and an interlocking lever disposed at a predetermined distance from the manipulation lever, wherein the interlocking lever pivots in conjunction with the hook lever, and when the manipulation lever is manipulated to pivot in a slid position, pivots the locking lever.

The console body may include a locking aperture. The locking lever of the opening/closing plate may include a catching portion configured to be fitted into the locking aperture and a corresponding portion bent and extending from the catching portion. The manipulation lever may include a knob portion that extends forward from a pivot point of the manipulation lever and a pressing portion that extends backward from the pivot point of the manipulation lever, the pressing portion that corresponds to the corresponding portion in the initial position of the sliding cover.

The hook lever may include: a connecting portion that extends forward from a pivot point of the hook lever; an extension end portion that extends backward from the pivot point of the hook lever; and a downwardly-bent catching end portion at a distal end thereof. The pressing portion of the manipulation lever may include a pressing protrusion on one side thereof. The connecting portion of the hook lever may extend under the pressing protrusion and thus, the connecting portion may be caught by the pressing protrusion.

Further, the interlocking lever may include: an abutting portion pivotally disposed above the extension end portion of the hook lever, the butting portion extending forward from a pivot point of the interlocking lever and being bent downward to abut the extension end portion; and a pressing portion that extends backward from the pivot point of the interlocking lever and may be bent downward, wherein the interlocking lever corresponds to the corresponding portion of the locking lever in the slid position of the sliding cover.

The extension end portion of the hook lever may have an open aperture, through which the pressing portion may rotate downwards when the interlocking lever pivots. The locking lever and the plurality of locking recesses of the opening/closing plate may be arranged linearly in a forward and backward direction. The manipulation lever and the interlocking lever may be arranged linearly over the plurality of locking recesses of the opening/closing plate.

According to the apparatus for opening and closing an armrest having the above-described structure, after an armrest is slid to a position, it may be possible to selectively lock and unlock the position of the armrest using an armrest locking unit. It may thus be possible to prevent the weight of the armrest or vibrations of a vehicle from accidentally changing the position of the armrest against the intention of the user. In particular, the operation of unlocking the opening/closing plate from the console body and the operation of unlocking the sliding cover from the opening/closing plate may be performed simultaneously with a single unlocking manipulation, whereby the user may rapidly and conveniently perform the operations of opening/closing and sliding the armrest.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an apparatus for opening and closing a sliding armrest console according to an exemplary embodiment of the present invention will be described in greater detail with reference to the accompanying drawings.

Figure 1:
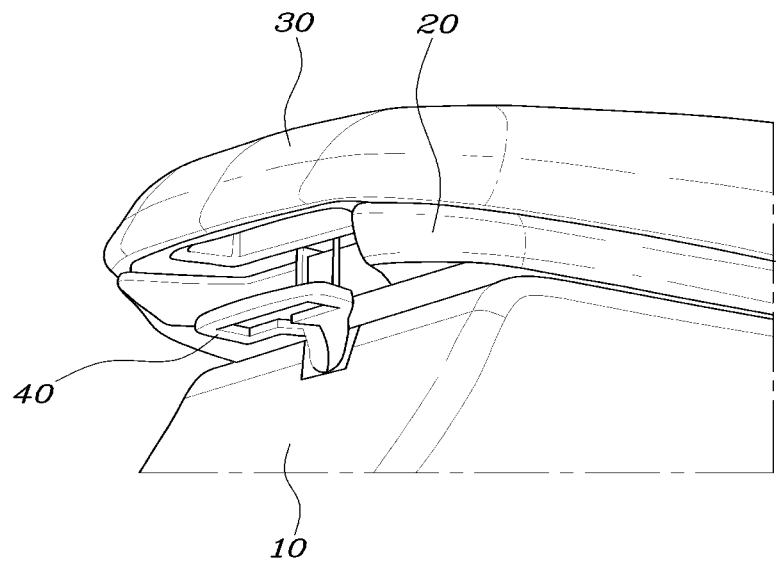
FIGS. 1 to 3 are schematic views illustrating a problem occurring in the use of a typical sliding armrest console according to the related art.
Figure 2:
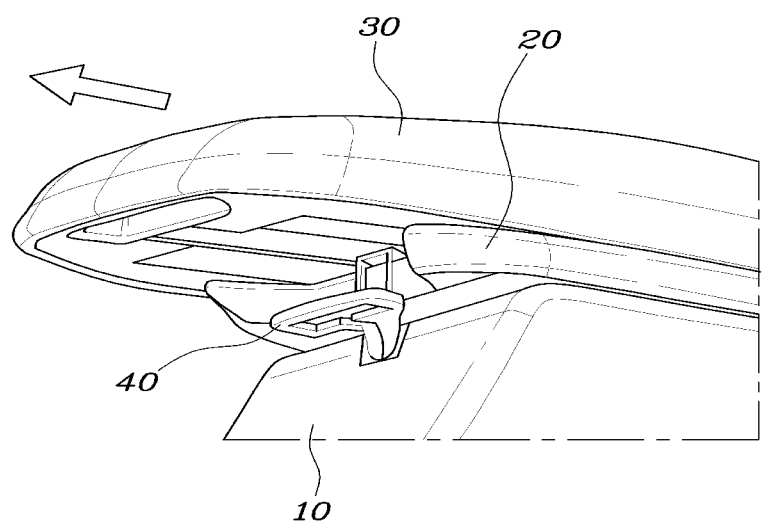
Figure 3:
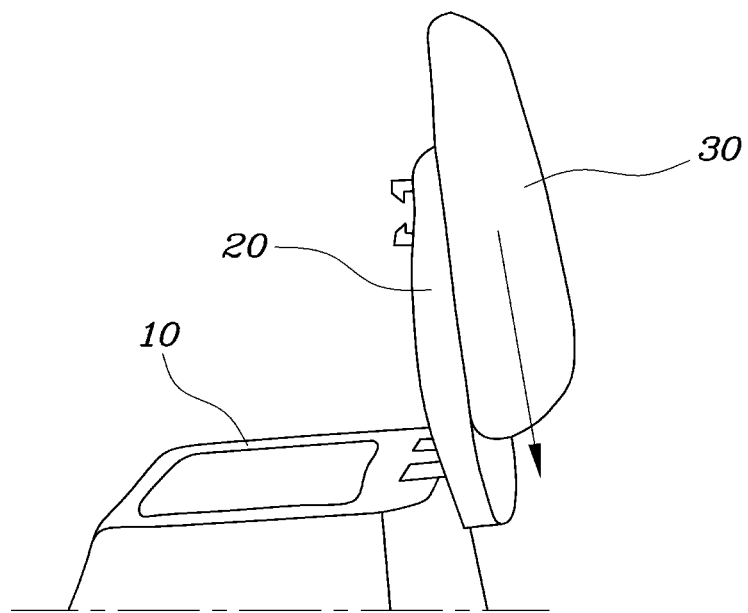
Figure 4:
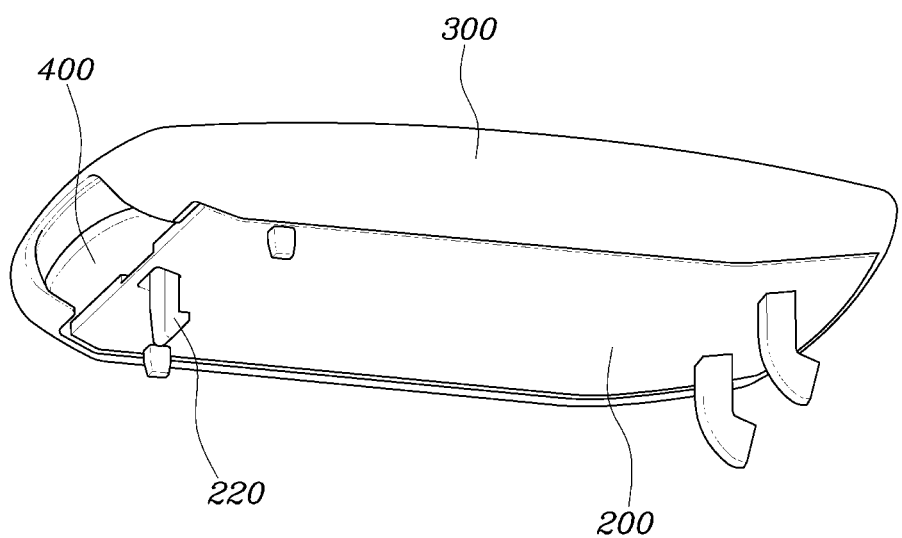
FIG. 4 is a perspective view illustrating an apparatus for opening and closing a sliding armrest console according to an exemplary embodiment of the present invention.
Figure 5:
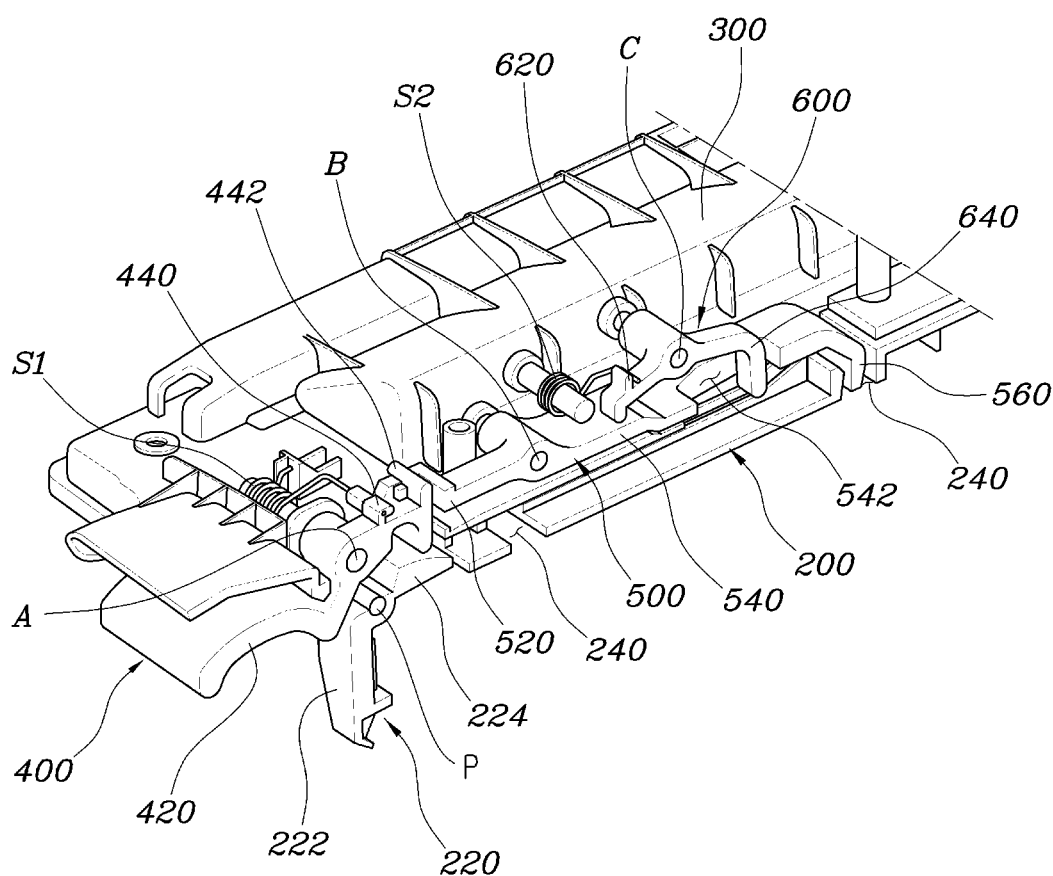
FIGS. 5 and 6 are cross-sectional views illustrating the operating positions of the apparatus for opening and closing a sliding armrest console illustrated in FIG. 3 according to an exemplary embodiment of the present invention.
Figure 6:
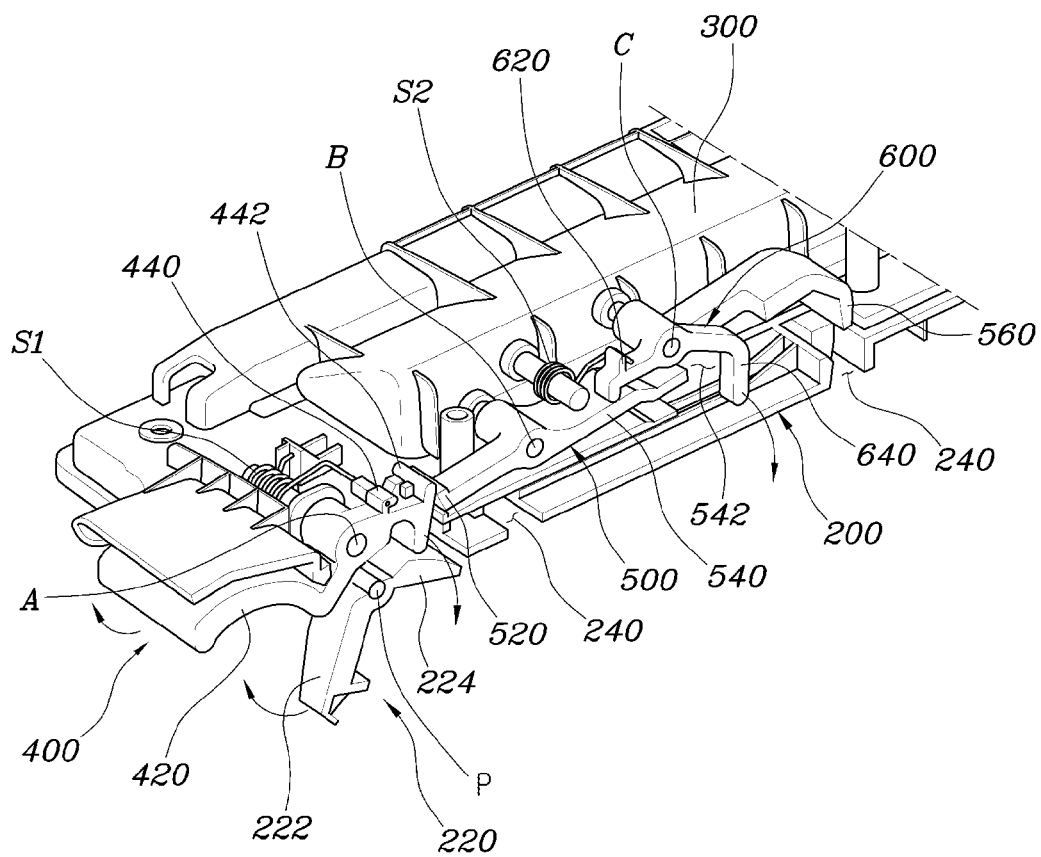

FIGS. 1 to 3 are schematic views illustrating a problem occurring in the use of a typical sliding armrest console according to the related art, FIG. 4 is a perspective view illustrating an apparatus for opening and closing a sliding armrest console according to an exemplary embodiment of the present invention, FIGS. 5 and 6 are cross-sectional views illustrating the operating positions of the apparatus for opening and closing a sliding armrest console illustrated in FIG. 4, and FIGS. 7 to 10 are side cross-sectional views illustrating the apparatus for opening and closing a sliding armrest console illustrated in FIG. 4.

A sliding armrest console of the related art has several problems. As illustrated in FIG. 1, it may be difficult to manipulate a hook 40 to pivot a plate 20 of a console box in a position in which an armrest 30 is slid forwards. In addition, as illustrated in FIGS. 2 and 3, when an opening/closing plate 20 is pivoted in the position in which an armrest 30 is slid forwards, the armrest 30 may accidently drop due to the weight thereof or due to vibrations of the vehicle.

Accordingly, to overcome these problems, the present exemplary embodiment provides an apparatus for opening and closing a sliding armrest console, the apparatus having a sliding armrest structure. The apparatus may include: a console body 100; an opening/closing plate 200 pivotably disposed on the console body 100; and a sliding cover 300 configured to slide on (e.g., over) the opening/closing plate 200. The opening/closing plate 200 may be pivotally hinge-engaged with the rear end of the console body 100, and the sliding cover 300 may be slidably engaged with the opening/closing plate 200 by a rail structure allowing the sliding cover 300 to slide on the opening/closing plate 200. Since a variety of structures for allowing the armrest to slide forwards and backwards is known in the art, detailed descriptions thereof will be omitted. The present invention is directed to enabling a locking position to be rapidly performed with a single unlocking manipulation, the locking position restraining the opening/closing operation and the sliding operation of the armrest.

As illustrated in FIGS. 4 to 6, in the apparatus for opening/closing a sliding armrest console according to the present exemplary embodiment, a locking lever 220 and a plurality of locking recesses 240 may be disposed on the opening/closing plate 200. The locking lever 220 may be configured to lock or unlock the opening/closing plate 200 to and from the console body 100. The locking recesses 240 may be configured to restrain the sliding of the sliding cover 300, and may be spaced apart predetermined distances from each other. The apparatus may further include an unlocking unit disposed on the sliding cover 300. The unlocking unit may be configured to operate in conjunction with the locking lever 220 to unlock the opening/closing plate 200 based on a pivoting manipulation. In addition, based on the position of the sliding cover 300, the unlocking unit may be released from one of the plurality of locking recesses 240, to permit the sliding cover 300 to slide.

In particular, the locking unit, allowing the opening/closing operation and the sliding operation of the armrest to be adjusted with a single manipulation, may include a manipulation lever 400, a hook lever 500, and an interlocking lever 600. The manipulation lever 400 may be pivotally disposed on the front end of the sliding cover 300, and allows the locking lever 220 to be unlocked by a pivoting manipulation at an initial position of the sliding cover 300. The hook lever 500 may be pivotally disposed (e.g., capable of being turned as if on a pivot) at the rear of the manipulation lever 400 to allow the hook lever 500 to operate in conjunction with the manipulation lever 400. The hook lever 500 may be fitted into one of the plurality of locking recesses 240 formed in the opening/closing plate 200 to restrain the sliding of the sliding cover 300, and may be removed from the one of the plurality of locking recesses 240 when the manipulation lever 400 is manipulated to pivot. The interlocking lever 600 may be disposed at a predetermined distance from the manipulation lever 400, and may be configured to pivot in conjunction with (e.g., together with) the hook lever 500. When the manipulation lever 400 is manipulated to pivot in a position in which the sliding cover 300 is slid, the interlocking lever 600 may be configured to pivot the locking lever 220.

As described above, according to the present invention, the manipulation lever 400, the hook lever 500, and the interlocking lever 600 constitute the single unlocking unit. The manipulation lever 400 and the interlocking lever 600 may be configured to unlock the console body 100 and the opening/closing plate 200 from each other. In other words, the manipulation lever 400 is provided for the purpose of unlocking in the initial position of the sliding cover 300, and the sliding cover 300 is provided for the purpose of unlocking in the slid position of the sliding cover 300.

The hook lever 500 may be configured to operate in conjunction with the manipulation lever 400. In particular, the hook lever 500 may be selectively fitted into the plurality of locking recesses 240 of the opening/closing plate 200, thereby allowing or restraining the sliding operation of the sliding cover 300. The manipulation lever 400 may be directly manipulated by a user and in response to user manipulation of the manipulation lever 400, the hook lever 500 and the interlocking lever 600 may be configured to operate in conjunction with the manipulation lever 400 to enable the opening operation and the sliding operation of the armrest.

Figure 7:
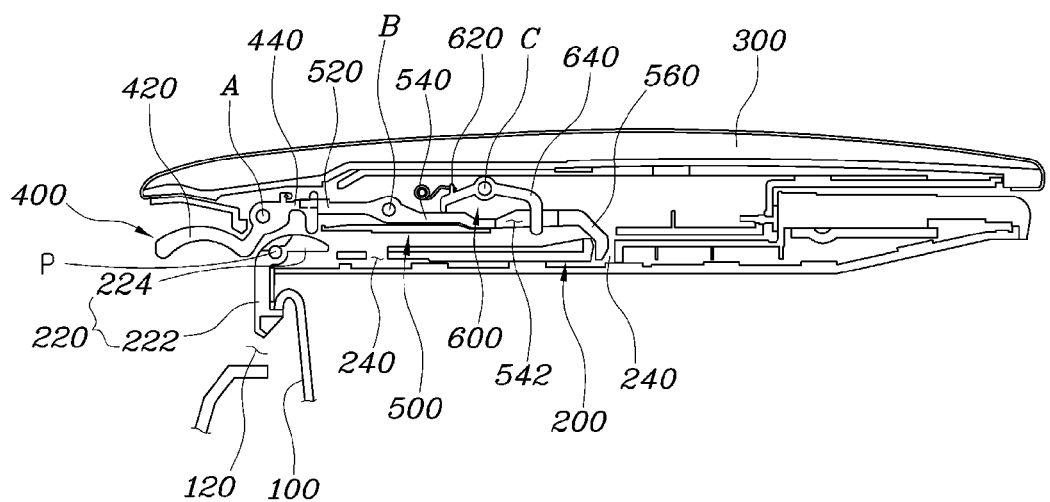
FIGS. 7 to 10 are side cross-sectional views illustrating the apparatus for opening and closing a sliding armrest console illustrated in FIG. 4 according to an exemplary embodiment of the present invention.

Hereinafter, the unlocking unit for the operations of opening and sliding the armrest according to the present invention will be described in detail. As illustrated in FIGS. 5 and 7, the console body 100 may include a locking aperture 120, and the locking lever 220 of the opening/closing plate 200 may include a catching portion 222 configured to be fitted into the locking aperture 120 and a corresponding portion 224 bent and extending from the catching portion 222. Specifically, the locking lever 220 of the opening/closing plate 200 may be configured to pivot on a hinge pin P. In the locking lever 220, the catching portion 222 may extend downward in the shape of a hook, and the corresponding portion 224 may bent and extend from the catching portion 222. Particularly, the hinge pin P may be fitted into a location in which the corresponding portion 224 is connected to the catching portion 222, and thus, the catching portion 222 and the corresponding portion 224 may be configured to rotate as a unitary body around the hinge pin P.

When the catching portion 222 is fitted into the locking aperture 120 formed in the console body 100, the locking lever 220 may be in the locked position in which the opening of the armrest is restrained. When the user manipulates the manipulation lever 400, which will be described later, to pivot, the locking lever 220 may be configured to rotate in conjunction with the manipulation lever 400, and thus, the catching portion 222 may be released from the locking aperture 120, thereby allowing the armrest to be opened.

The plurality of locking recesses 240 formed in the opening/closing plate 200 may be spaced apart at predetermined distances from each other in the forward and backward direction. Since the plurality of locking recesses 240 may be formed in the opening/closing plate 200 as described above, the sliding cover 300 may be fixed in an initial position or a slid position as the hook lever 500, which will be described later, is fitted into one of the plurality of locking recesses 240.

Specifically, as illustrated in FIG. 7, the manipulation lever 400 may be pivotally disposed on the front end of the sliding cover 300, in which a knob portion 420 extends forward from a pivot point A, and a pressing portion 440 extends backward from the pivot point A. The pressing portion 440 corresponds to the corresponding portion 224 in the initial position of the sliding cover 300. Particularly, the manipulation lever 400 may be configured to pivot by being elastically supported by an elastic spring 51 before returning to an original position.

In other words, the manipulation lever 400 may be directly manipulated by a user using the forwardly-extending knob 420. When the user manipulates the knob portion 420 to pivot, the pressing portion 440 extending in the opposite direction may be configured to rotate in the opposite direction, thereby pressing the corresponding portion 224 of the locking lever 220. Thus, an unlocking manipulation may be enabled when the sliding cover 300 is in the initial position. As the corresponding portion 224 of the locking lever 220 is pressed to rotate, the catching portion 222 may be released from the locking aperture 120 of the console body 100, thereby allowing the opening/closing plate 200 to rotate.

The hook lever 500 rotating in conjunction with the manipulation lever 400 may be disposed on the sliding cover 300 to be at the rear of the manipulation lever 400. Additionally, the hook lever 500 may include a connecting portion 520 that extends forward from a pivot point B to abut against the pressing portion 440 of the manipulation lever 400, an end portion 540 that extends backward from the pivot point B, and a downwardly-bent extension catching end portion 560 at the distal end thereof.

Figure 8:
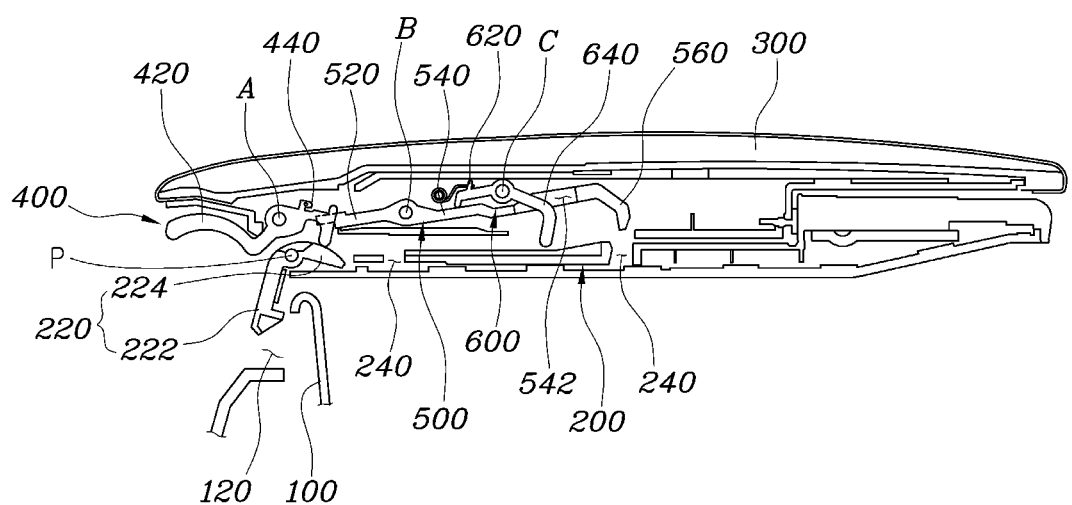

The pressing portion 440 of the manipulation lever 400 may include a pressing protrusion 442 on one side (e.g., a first side) thereof, and the connecting portion 520 of the hook lever 500 may extend under the pressing protrusion 442 to allow the connecting portion 520 to be caught by the pressing protrusion 442. In other words, in the initial position of the hook lever 500, the catching end portion 560 of the extension end portion 540 may be fitted into one of the plurality of locking recesses 240 of the opening/closing plate 200 to restrain the sliding of the sliding cover 300. Particularly, as illustrated in FIG. 8, when the manipulation lever 400 is manipulated to pivot, in response to the pressing portion 440 pivoting downwards, the pressing protrusion may be configured to press the connecting portion 520 of the hook lever 500 positioned at the front. At the rear, the extension end portion 540 may be configured to rotate upwards, and thus the catching end portion 560 may be released from the plurality of locking recesses 240. This consequently enables the sliding cover 300 to slide.

As illustrated in FIG. 6, the interlocking lever 600 may include an abutting portion 620 and a pressing portion 640. The abutting portion 620 may be pivotally disposed above the extension end portion 540 of the hook lever 500. The abutting portion 620 may extend forward from a pivot point C, and may be bent downward to abut against the extension end portion 540. The pressing portion 640 may extend backward from the pivot point C, and may be bent downward to correspond to the corresponding portion 224 of the locking lever 220 in a position in which the sliding cover 300 is slid. The interlocking lever 600 may be elastically supported by an elastic spring S2 to allow the interlocking lever 600 to return to the original position.

Furthermore, the interlocking lever 600 may be configured with the forwardly-extending abutting portion 620 abutting against the extension end portion 540 of the hook lever 500 and the backwardly-extending pressing portion 640 pressing the corresponding portion 224 of the locking lever 220. In other words, when the hook lever 500 pivots, the interlocking lever 600 may be configured to pivot with the abutting portion 620 thereof working in conjunction with the upwardly-rotating extension end portion 540, and thus, the pressing portion 620 in the opposite side may be configured to rotate downwards, thereby pressing the corresponding portion 224 of the locking lever 220.

Figure 9:
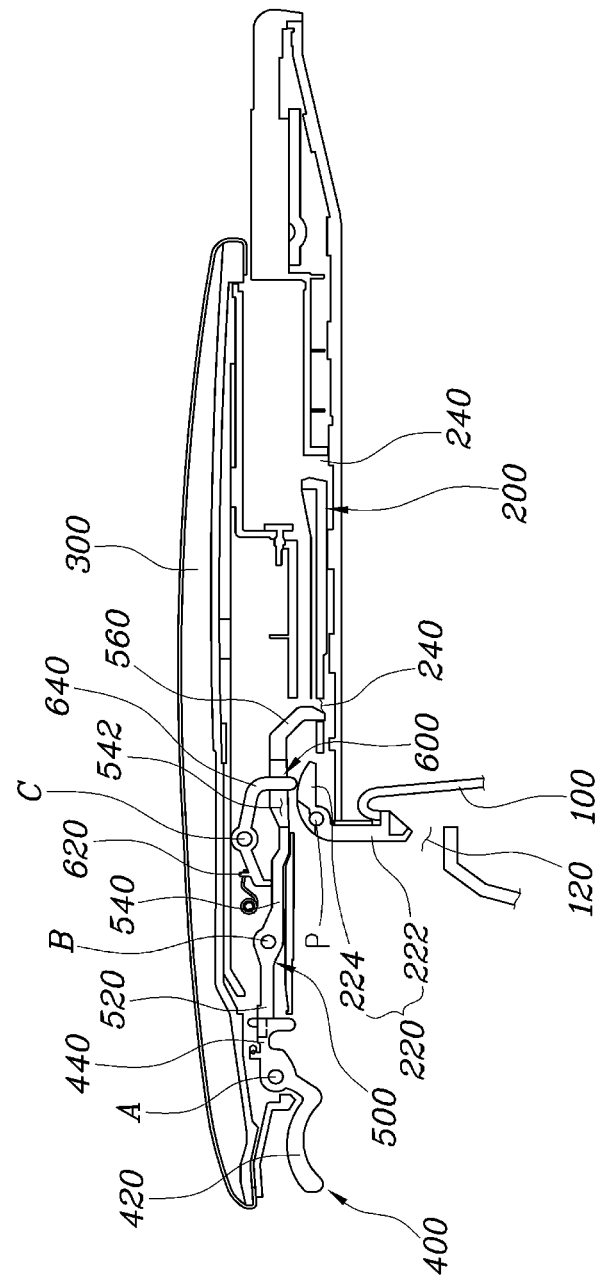
Figure 10:
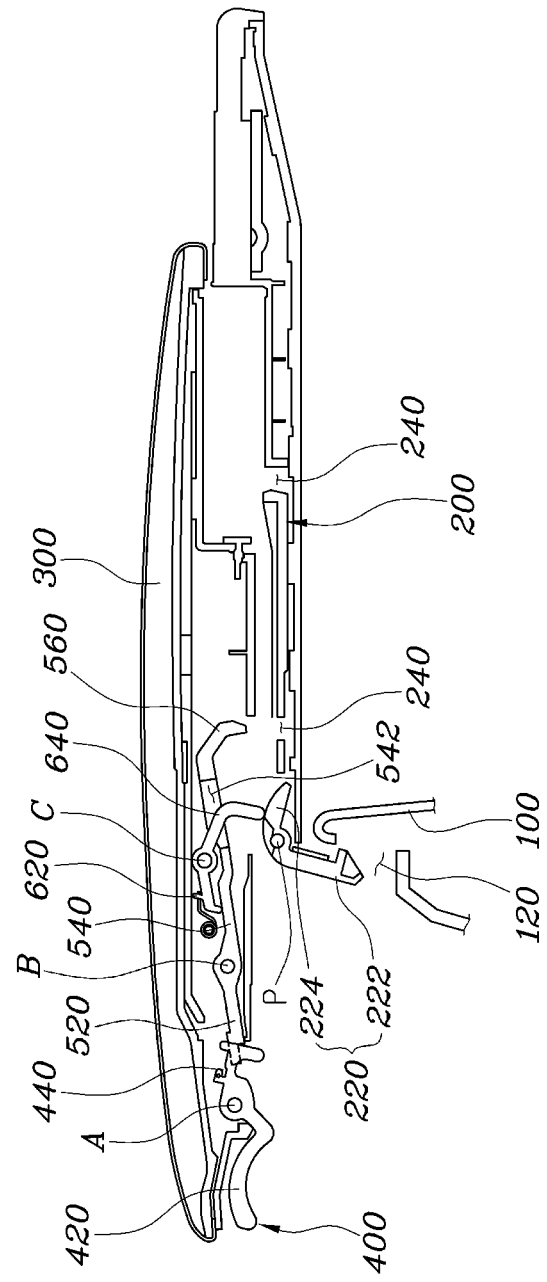

Accordingly, the unlocking manipulation may be enabled when the sliding cover 300 is in the slid position, as illustrated in FIGS. 9 and 10. As the manipulation lever 400 is manipulated to pivot in the position in which the sliding cover 300 is slid, when the interlocking lever 600 pivots, the pressing portion 640 may be configured to press the corresponding portion 224 of the locking lever 220 to rotate to release the catching portion 222 from the locking aperture 120 of the locking body 100 to allow the opening/closing plate 200 to rotate.

In particular, the extension end portion 540 of the hook lever 500 may include an open aperture 542, through which the pressing portion 640 may rotate downwards when the interlocking lever 600 pivots. Consequently, when the interlocking lever 600 pivots, the pressing portion 640 may be configured to pivot without interfering with the hook lever 500. In addition, the locking lever 220 and the plurality of locking recesses 240 of the opening/closing plate 200 may be disposed linearly in the forward and backward direction, and the manipulation lever 400 and the interlocking lever 600 may be disposed linearly over the plurality of locking recesses 240 of the opening/closing plate 200. It may thus be possible to realize a compact structure and reduce the size of a resultant assembly.

Furthermore, the locking lever 220, the manipulation lever 400, the hook lever 500, and the interlocking lever 600 may be in the shape of a plate each having a predetermined width in the transverse direction to reduce the layout. As described above, in the unlocking structure for the opening and sliding of an armrest, the unlocking unit, including manipulation lever 400, the hook lever 500, and the interlocking lever 600, makes it possible to unlock the armrest from the opened or slid position with a single manipulation. In addition, even when the sliding cover 300 is slid and the position thereof is changed, the unlocking unit of the present invention enables the unlocking manipulation in a simplified and correct manner regardless of the position of the sliding cover 300.

According to the apparatus for opening and closing an armrest having the above-described structure, after an armrest is slid to a position, it may be possible to selectively lock and unlock the position of the armrest using an armrest locking unit. It may thus be possible to prevent the weight of the armrest or vibrations of a vehicle from accidentally changing the position of the armrest against the intention of the user. In particular, the operation of unlocking the opening/closing plate 200 from the console body and the operation of unlocking the sliding cover from the opening/closing plate 200 may be simultaneously performed with a single unlocking manipulation, whereby the user may rapidly and conveniently perform the operations of opening/closing and sliding the armrest.

Although the exemplary embodiments of the present invention have been described for illustrative purposes, a person skilled in the art will appreciate that various modifications, additions and substitutions are possible, without departing from the scope and spirit of the present invention as disclosed in the accompanying claims.

What is claimed is:

1. An apparatus for opening and closing a sliding armrest console, comprising:
   a console body;
   an opening/closing plate pivotably disposed on the console body;
   a sliding cover configured to slide on the opening/closing plate;
   wherein the opening/closing plate includes a locking lever disposed at a front part of the opening/closing plate to lock and unlock the opening/closing plate to and from the console body and a plurality of locking recesses configured at a rear of the locking lever to restrain the sliding of the sliding cover, the locking recesses being spaced apart at predetermined distances from each other;
   a manipulation lever pivotably disposed on a front end of the sliding cover, wherein the manipulation lever allows the locking lever to be unlocked by the pivoting manipulation at an initial position of the sliding cover and pressing the locking lever disposed below the manipulation lever;
   a hook lever pivotably disposed at the sliding cover and configured to operate in conjunction with the manipulation lever at a rear of the manipulation lever, wherein the hook lever is fitted into a locking recess among the plurality of locking recesses formed in the opening/closing plate to restrain the sliding of the sliding cover, and is removed from the locking recess among the plurality of locking recesses by pivoting in conjunction with the pivoting of the manipulation lever when the manipulation lever is manipulated to pivot; and
   an interlocking lever disposed at the sliding cover by being spaced apart from the manipulation lever at a predetermined distance, wherein the interlocking lever is configured to pivot in conjunction with the hook lever, and when the manipulation lever is manipulated to pivot in a forward slid position of the sliding cover, is configured to pivot the locking lever by pressing the locking lever disposed below the interlocking lever.

2. The apparatus according to claim 1, wherein the console body has a locking aperture, and wherein the locking lever of the opening/closing plate includes a catching portion configured to be fitted into the locking aperture and a corresponding portion bent and extending from the catching portion.

3. The apparatus according to claim 2, wherein the manipulation lever includes:
   a knob portion that extends forward from a pivot point of the manipulation lever; and
   a pressing portion that extends backward from the pivot point of the manipulation lever,
   wherein the pressing portion corresponds to the corresponding portion in the initial position of the sliding cover.

4. The apparatus according to claim 3, wherein the hook lever includes:
   a connecting portion that extends forward from a pivot point of the hook lever;
   an extension end portion that extends backward from the pivot point of the hook lever; and
   a downwardly-bent catching end portion at a distal end thereof.

5. The apparatus according to claim 4, wherein the pressing portion of the manipulation lever includes a pressing protrusion on one side thereof, and the connecting portion of the hook lever extends under the pressing protrusion to cause the connecting portion to be caught by the pressing protrusion.

6. The apparatus according to claim 4, wherein the interlocking lever includes:
   an abutting portion pivotally disposed above the extension end portion of the hook lever, the abutting portion extending forward from a pivot point of the interlocking lever and being bent downward to abut to the extension end portion; and
   a pressing portion that extends backward from the pivot point of the interlocking lever and is bent downward,
   wherein the interlocking lever corresponds to the corresponding portion of the locking lever in the slid position of the sliding cover.

7. The apparatus according to claim 6, wherein the extension end portion of the hook lever has an open aperture, through which the pressing portion rotates downwards when the interlocking lever pivots.

8. The apparatus according to claim 1, wherein the locking lever and the plurality of locking recesses of the opening/closing plate are disposed linearly in a forward and backward direction.

9. The apparatus according to claim 8, wherein the manipulation lever and the interlocking lever are disposed linearly over the plurality of locking recesses of the opening/closing plate.

\* \* \* \* \*